US007805171B2

(12) United States Patent
Alameh et al.

(10) Patent No.: US 7,805,171 B2
(45) Date of Patent: Sep. 28, 2010

(54) EARMOUNTED ELECTRONIC DEVICE AND METHOD

(75) Inventors: Rachid Mohsen Alameh, Crystal Lake, IL (US); Jin Dong Kim, Pleasant Prairie, WI (US); Thomas Yates Merrell, Beach Park, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 723 days.

(21) Appl. No.: 11/682,704

(22) Filed: Mar. 6, 2007

(65) Prior Publication Data

US 2008/0220831 A1    Sep. 11, 2008

(51) Int. Cl.
*H04M 1/00*    (2006.01)
(52) U.S. Cl. ............... 455/575.2; 455/575.1; 455/575.6; 455/569.1
(58) Field of Classification Search ............... 455/575.2, 455/572, 568, 522, 41.2, 13.4, 77, 87, 557, 455/562.1, 569.1, 90.3, 159.1, 162.1, 193.1, 455/234.1, 575.1, 575.6, 567, 556.1, 456, 455/552.1, 5, 69.1; 343/718
See application file for complete search history.

(56) References Cited

U.S. PATENT DOCUMENTS

| 6,764,012 | B2 | 7/2004 | Connolly et al. | |
| 2002/0016155 | A1 | 2/2002 | Charbonnier | |
| 2003/0064732 | A1* | 4/2003 | McDowell et al. | 455/456 |
| 2003/0210203 | A1* | 11/2003 | Phillips et al. | 343/850 |
| 2004/0179694 | A1 | 9/2004 | Alley | |
| 2004/0185915 | A1* | 9/2004 | Ihara et al. | 455/569.1 |
| 2005/0058280 | A1* | 3/2005 | Ma | 379/430 |
| 2006/0029234 | A1 | 2/2006 | Sargaison | |
| 2006/0064037 | A1* | 3/2006 | Shalon et al. | 600/586 |
| 2006/0166702 | A1 | 7/2006 | Dietz et al. | |
| 2008/0231524 | A1* | 9/2008 | Zeiger et al. | 343/718 |

FOREIGN PATENT DOCUMENTS

| WO | 0163888 A1 | 8/2001 |
| WO | 2001063888 A | 8/2001 |
| WO | 2001086923 A | 11/2001 |
| WO | 2005099105 A | 10/2005 |

* cited by examiner

*Primary Examiner*—Tan Trinh
(74) *Attorney, Agent, or Firm*—Hisashi D. Watanabe

(57) ABSTRACT

Disclosed is a wireless communication device capable of being positioned in a wearable position adjacent a user's head. The wireless communication device may include a housing and an arcuate earmount coupled to the housing. The earmount may be configured so that it includes an overhanging portion and a hinge portion, the hinge portion electrically and mechanically coupling the earmount to the housing. A proximity sensor can be positioned on the overhanging portion and configured to detect proximity of a user's skin behind the user's ear. The sensor location for earmounted devices can provide that the sensor may be trapped between the user's ear auricle and the user's head as the earmount sits down on the top portion of the ear, which may result in accurate sensing activation. The device may be further configured to, for example, change a state based on whether the proximity sensor detects proximity.

18 Claims, 4 Drawing Sheets

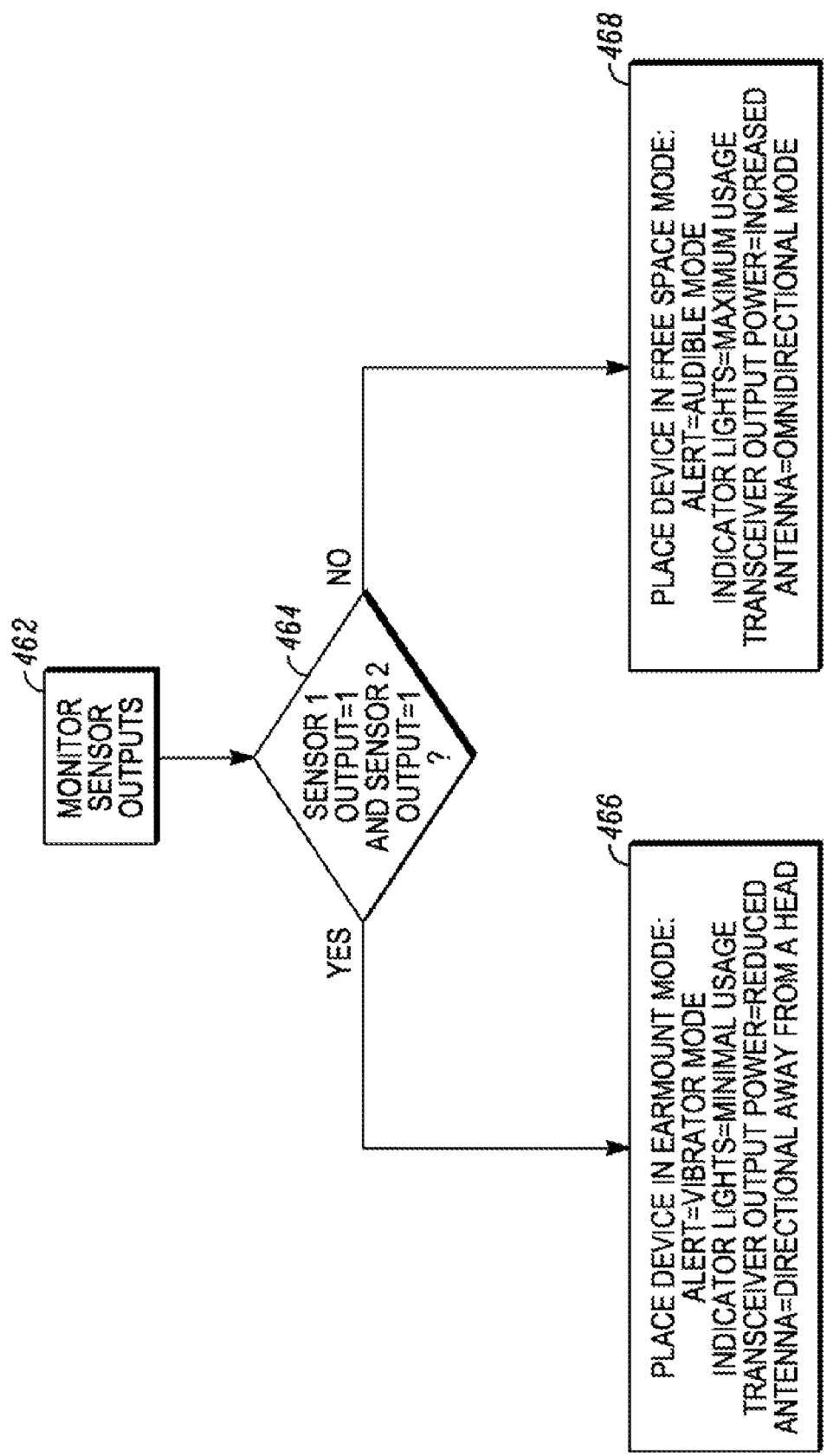

EARMOUNTED ELECTRONIC DEVICE AND METHOD

FIELD

Disclosed are methods and devices for a wireless communication device capable of being positioned in a wearable position adjacent a user's head, and more particularly, methods and devices to detect use in a wearable position and to accordingly modify a state and behavior of the device.

BACKGROUND

The makers of mobile communication devices, including those of cellular telephones, are increasingly adding functionality to their devices. While there is a trend toward the inclusion of more features and improvements for current features, there is also a trend toward smaller mobile communication devices. As mobile communication device technology has continued to improve, the devices have become increasingly smaller. Therefore, there may less surface area for placement of user interface components as manufacturers continue to add features and reduce their products' size.

Electronic devices and cellular telephones in particular, are often equipped with sensors. In cellular telephones, a light sensor may detect ambient light to regulate power to a display screen. A proximity sensor may detect that a device is positioned within a pocket to place the device in stand-by mode. The type of sensor and the placement of the sensor on the housing of an electronic device may be restricted by the size and configuration of the device housing as well as the function provided by the sensor.

BRIEF DESCRIPTION OF THE DRAWINGS

FIG. 4 is a flowchart illustrating another embodiment of a method of the depicted device.

DETAILED DESCRIPTION

Figure 1:
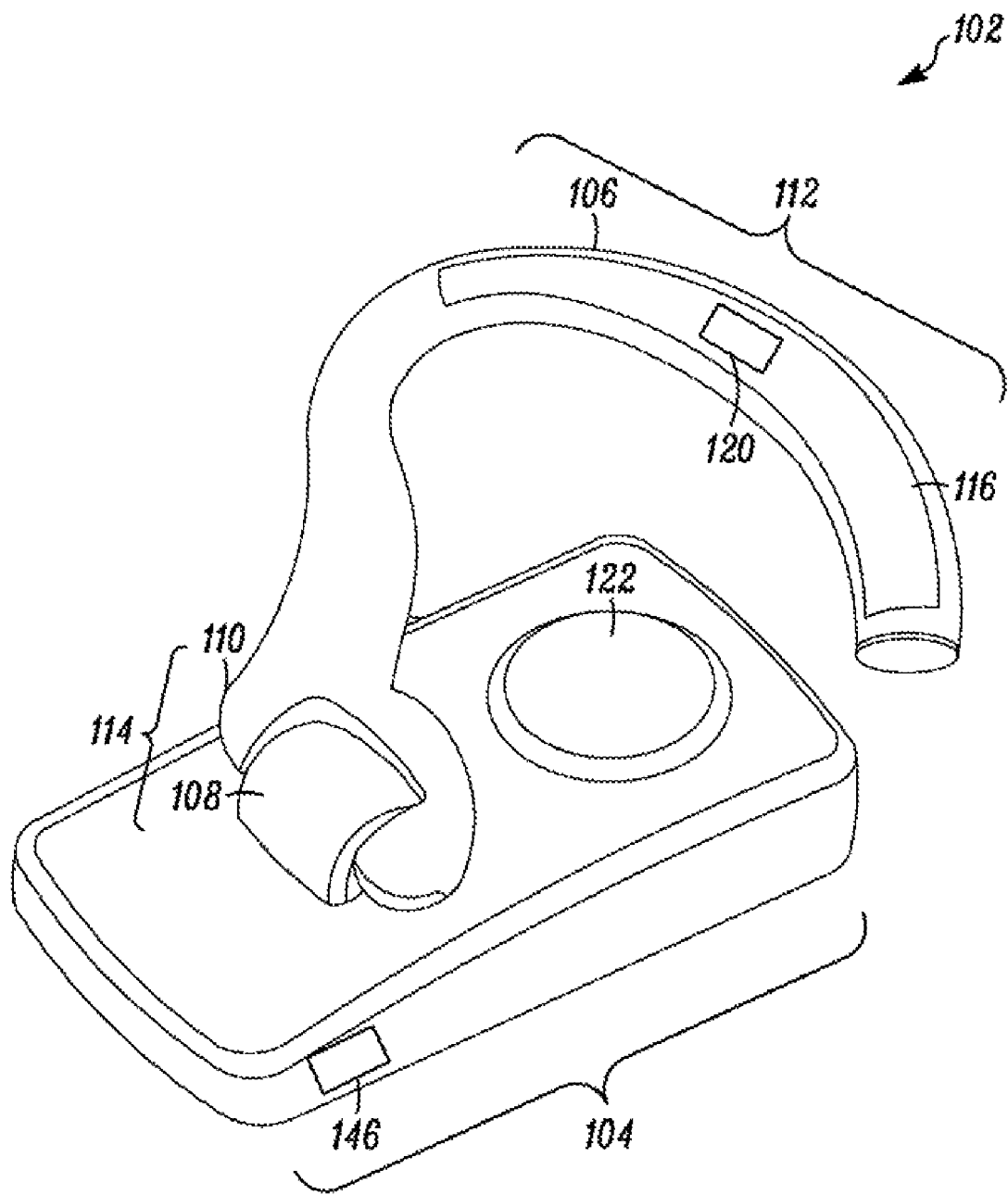
FIG. 1 depicts an electronic device that may be a wireless communication device such as a cellular telephone or a headset.

As the surface area for placement of user interface components continues to grow smaller with continued innovation in size reduction, manufacturers may wish to utilize structural components that traditionally do not support circuitry for electronic components. Moreover, in smaller devices, smaller power sources such as a small battery may be preferable. Therefore, in particularly small devices, in addition to surface area limitations there may be a premium on power conservation in smaller devices.

Disclosed is a wireless communication device capable of being positioned in a wearable position adjacent a user's head. The wireless communication device may include a housing and an earmount coupled to the housing. The earmount can have any suitable shape, including an arcuate shape of an earhook or an earloop. In this way, the earmount can make a wireless communication device an over-the-ear device that can be convenient to use.

The earmount may be configured so that it includes an overhanging, lower, or extended portion and a hinge portion, the hinge portion coupling the earmount to the housing. The overhanging portion of the earmount may make simple situating the device over the ear and thus may be convenient for use. The overhanging portion may hang over a user's ear when positioned adjacent a user's head, and over the user's ear. The overhanging portion of the earmount may be stable, even when touched by the user due to the manner in which it may hang down from the ear from which it is balanced.

As will be described in more detail below, disclosed is a proximity sensor that can be positioned on the overhanging portion of an earmount, the proximity sensor configured to detect proximity of, for example, the user's skin behind the user's ear. The sensor location for the depicted earmounted devices or for others not shown can provide that the sensor may be trapped between the auricle of the user's ear and the user's head as the earmount sits down on the top portion of the ear, which may result in accurate sensing activation. The device may be further configured to, for example, change a state based on whether the proximity sensor detects proximity of an object. The device further can be configured to maintain at least one of a plurality of states that can include for example, an active mode and a standby mode. In this way, when the device does not sense proximity to another object, and in particular, to the skin behind a user's ear, the device may power down and therefore conserve energy and possibly extend battery life. Additional benefits of utilization of sensor signals of the disclosed proximity sensor may include improved radio frequency (RF) transmission, an improved user interface (UI) and improved talk time.

In one embodiment, the earmount can include a vibrator configured to generate a vibratory alert and the device can include a speaker disposed within the housing and configured to generate an audible alert. The device further may be configured to switch between generation of the audible alert via the speaker and generation of the vibratory alert via the vibrator, based on whether the sensor detects proximity.

In another embodiment, the device can include at least one indicator light configured to generate a visible indication of a state of the device and coupled to a circuit configured to switch between activation of the indicator light and deactivation of the indicator light based on whether the proximity sensor detects proximity.

In another embodiment, the device can include a transceiver that is coupled to a circuit configured to change a radio frequency (RF) output power of the transceiver, based on whether the proximity sensor detects proximity. In yet another embodiment, the device may include an alterable antenna conformation, such as for example described in commonly assigned U.S. Pat. No. 6,657,595, titled "Sensor-Driven Adaptive Counterpoise Antenna System," issued Dec. 2, 2003, and herein incorporated by reference in its entirety. The device may in addition include a circuit configured to alter the antenna conformation, based on whether the proximity sensor detects proximity.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

FIG. 1 depicts an electronic device 102 that may be a wireless communication device such as a cellular telephone or a headset. The device 102 can include electronic components that are supported by a housing 104. An earmount 106 can be coupled to the housing 104 at a position on the housing such as at a knuckle 108, by for example a hinge 110. The earmount, for example, may have a hook shape such as that depicted in FIG. 1 or for example, may have a loop shape. In any case, the earmount may have an arcuate shape.

The depicted earmount 106 may include an overhanging portion 112 and a hinge portion 114, the hinge portion including a hinge that may couple the earmount 106 to the housing 104. In another embodiment, the hinge portion 114 may rotatably couple the earmount 106 to the housing 104. The earmount 106 may also be detachable from the housing 104. Upon detachment and reattachment, the hinge 110 may be configured to change the orientation of the earmount 106 from a first orientation with respect the housing, such as the orientation depicted, to a second orientation with respect to the housing, which may be a mirror reflection of the depicted orientation. The hinge 110 that is coupled to the housing 104 may contain circuitry to direct signals received from the components of the earmount 106 to a controller that may be supported by the device housing 104.

The depicted earmount 106 shows a proximity sensor 116 that can be positioned on the overhanging portion 112 of the earmount 106 so that the proximity sensor 116 can be configured to detect proximity of for example, a user's skin behind the user's ear. It is understood that more than one proximity sensor may be positioned on the earmount, for example, on opposite sides of the earmount. The device 102 can be configured to change a state based on whether the proximity sensor 116 detects proximity. It is understood that the proximity sensor can occupy any suitable amount of surface area of the earmount 106, and in one embodiment, the overhanging portion 112 of the earmount 106.

In an embodiment where the hinge portion 114 of the earmount 106 includes a hinge that may rotatably and/or detachably couple the earmount 106 to the housing 104, the hinge 110 may be configured to change the orientation of the earmount from a first orientation with respect the housing to a second orientation with respect to the housing 104 upon rotation or detachment and reattachment of the earmount 106. In such an embodiment, at least one sensor 116 can be positioned on the earmount 106 to detect proximity when the earmount 106 is in either the first orientation or the second orientation with respect to the housing 104. In that embodiment, for example, a single sensor 116 may straddle two sides of the earmount 106 so that it may come into the contact with the user's skin behind the user's ear in either orientation. In another embodiment, where the earmount 106 has an oval or flatter shape, two sensors 116 for example may be positioned on the earmount 106, on either side of the earmount 106. It is understood that any position or configuration that one or more sensors 116 may have on the earmount 116 is within the scope of this discussion. Depending on the sensitivity of the proximity sensor, it may be beneficial to cover a larger portion of the earmount 116 than a smaller portion of the earmount 116 to minimize the possibility of false triggers.

The proximity sensor 116 may be a capacitive sensor. For example, the sensor 116 may include a conductive material deposited on or near the surface of the earmount forming one side or plate of a capacitor. A body in proximity may form the other side or plate of the capacitor. It is understood that a greater surface area of deposited conductive material provides more sensitivity for detection, for example, for detection of a body at distances up to one inch.

In another embodiment, the capacitive sensor may include two sides or plates or even a capacitive grid forming both sides or plates of a capacitor. In this instance the presence of a body alters the electric fields between the two sides, or in the grid.

In another embodiment the proximity sensor 116 may be an infrared (IR) sensor configured to detect proximity of a body by detecting body heat. Other types of sensors, for example, inductive sensors, may be used as well.

The proximity sensor 116 may be positioned on the earmount to assure contact in addition to proximity when the device is worn on a user's ear. When the proximity sensor achieves contact with the user's skin, detection may be improved. An earmount sensor may be trapped between the ear of a user and the user's head as the earmount rests on the ear, thereby improving detection.

In another embodiment, the electronic device 102 may include other components positioned on or within the earmount 106 such as a vibrator 120 configured to, for example, generate a vibratory alert. The vibrator 120 may be, for example, a piezoelectric vibrator or a speaker. The vibrator may generate miniscule vibrations that may be highly detectable when the device 102 is carried on a user's ear because of the possibility of a sensitive area behind the user's ear. Moreover, a speaker 122 can be disposed within the housing 104 and configured to generate an audible alert. Accordingly, the electronic device 102 may be configured to switch between generation of the audible alert via the speaker 122 and generation of the vibratory alert via the vibrator 120, based on whether the sensor 116 detects proximity. It is understood that the vibrator and speaker may positioned in any suitable location. Moreover, the speaker 122 can be a supplementary sensor or vibrator for redundancy.

Figure 2:
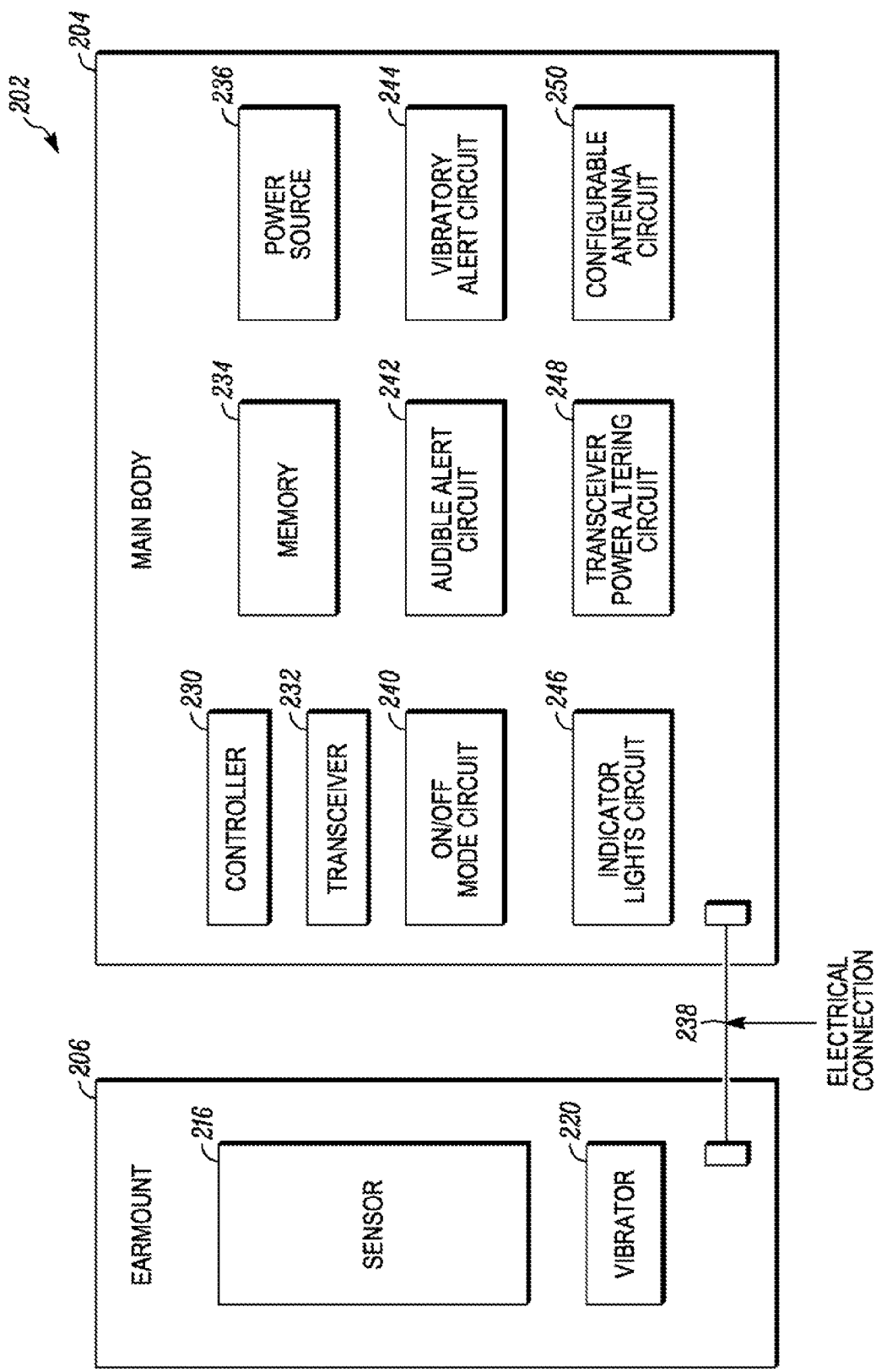
FIG. 2 depicts an embodiment of an electronic device such as wireless communication device that may be implemented as a cellular telephone or a headset including certain components.

FIG. 2 depicts certain components of an electronic device 202 such as wireless communication device that may be implemented as a cellular telephone (also called a mobile phone) or a headset. The mobile communication device 202 represents a wide variety of devices that have been developed for use within various networks. Such communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The electronic device 202 can include a controller 230, transceiver 232, memory 234 and a power source 236. Modules may be stored in the memory 234, and may carry out certain processes of the methods as described herein. The modules can be implemented in software, such as in the form of one or more sets of prestored instructions, and/or hardware, which can facilitate the operation of the electronic device as discussed below. The modules may be installed at the factory or can be installed after distribution by, for example, a downloading operation.

The main body of the device 204 is depicted as including various circuits that can be configured to be in communication with the controller 230. As discussed in detail above, the sensor 216 and vibrator 220 can be positioned on the earmount 206. Electrical connections 238 connecting the sensor 216 and/or the vibrator 220 to the controller 230 may be housed in the earmount hinge portion 114 (see FIG. 1) and the hinge 110 support of the main body illustrated at position or knuckle 108. It is understood that any manner in which the electrical connection 238 between the electrical components of the earmount 206 and the controller 230 in the main body 204 is made is within the scope of this discussion.

As discussed above, the device 202 can be configured to change a state based on whether the proximity sensor 216 detects proximity, and in particular, detects proximity of a user's skin behind the user's ear. The device 202 may also detect proximity of any other object, including a holster, carrying case, or pocket, or the touch of a user's hand. In any event, when the proximity sensor 216 generates a proximity signal which can be delivered to the controller 230, the state of the device may be changed. The state can include a power up or active mode and a power down or standby mode. An on/off mode circuit 240 is depicted to be in communication with the controller. Instructions may be received by the controller to activate or deactivate the on mode of the device. In this manner the energy of the power source 236 may be conserved since the device 202 may be in standby mode when the device is not positioned for use adjacent a user's ear.

In standby mode, the device 202 may receive communication signals via a transceiver 232 and if the sensor 216 does not provide a proximity signal, then an audible alert may be sounded by a speaker 122 (see FIG. 1). For this purpose an audible alert circuit 242 may generate an audible alert. On the other hand in the event that the sensor 216 does provide a proximity signal, then the audible alert circuit 242 may be disabled and the vibratory alert circuit 244 may generate a vibratory alert. In this way, if there is the possibility that the device 202 is actually positioned in a wearable position adjacent a user's head, there is less chance of improper audio output of a speaker close to a user's ear.

The device 202 may also include at least one indicator light 146 (see FIG. 1) configured to generate a visible indication of a state of the device and coupled to an indicator light circuit 246 in communication with the controller 230. The indicator light circuit 246 may be configured to switch between activation of an indicator light 146 and deactivation of the indicator light 146 based on whether the proximity sensor 206 detects proximity. In this way, energy of the power source 236 may be conserved when the device 202 is in a position adjacent a user's head since an indicator light in that position may not be viewable by the user.

In another embodiment, the transceiver 232 may be coupled to a transceiver power altering circuit 248 configured to change a radio frequency (RF) output power of the transceiver 232 based on whether the proximity sensor 216 detects proximity. In this way, when the device 202 is positioned adjacent a user's head, and the transceiver 232 may output less energy, the specific absorption rate (SAR) may be reduced. Also, the device may include an alterable antenna conformation circuit 250 coupled to the transceiver 232, the alterable antenna conformation circuit 250 configured to alter an antenna conformation, based on whether the proximity sensor 216 detects proximity.

Figure 3:
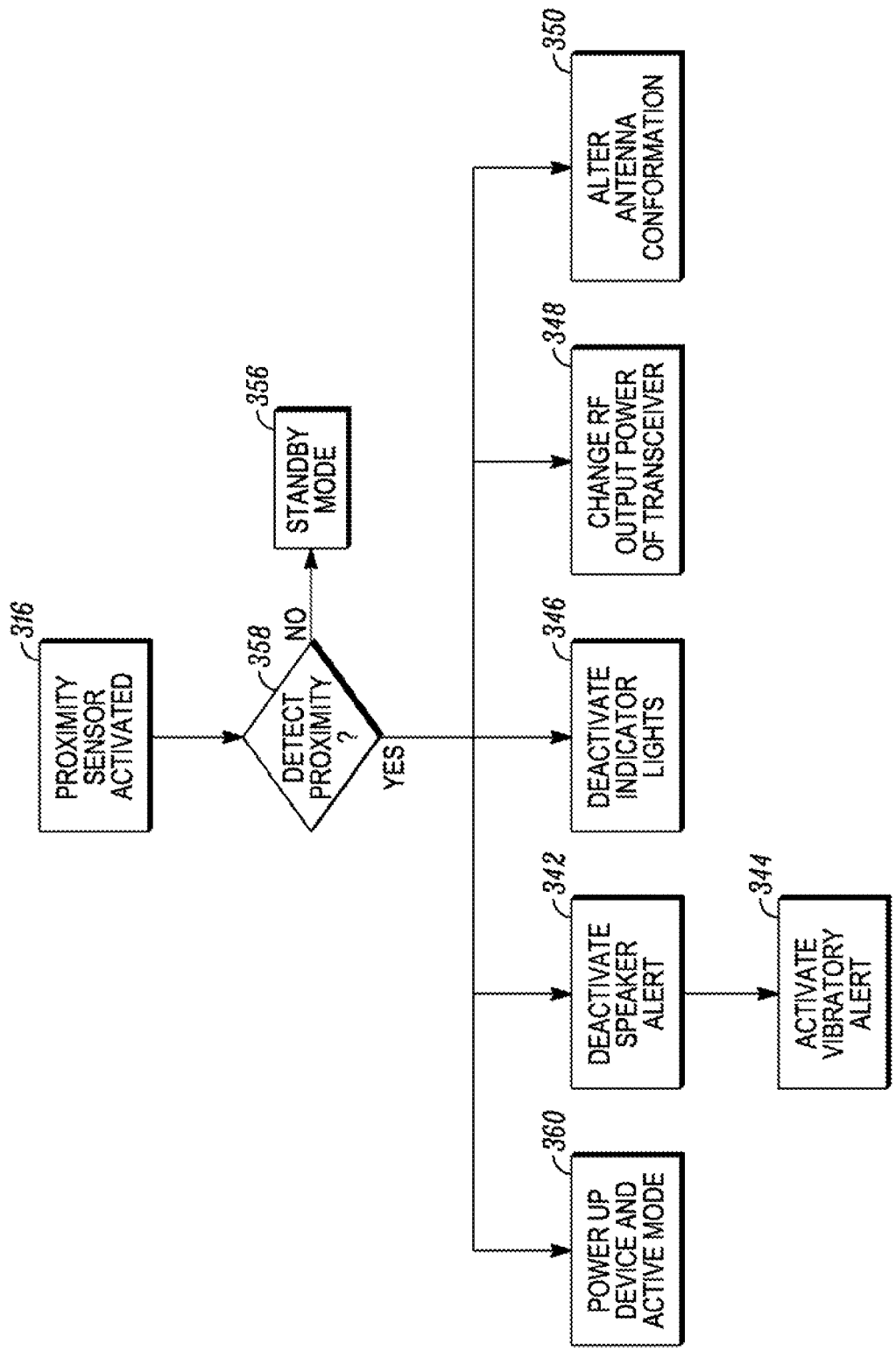
FIG. 3 is a flowchart illustrating an embodiment of a method of the depicted device.

FIG. 3 is a flowchart illustrating an embodiment of a method of the device 202 (see FIG. 2). A proximity sensor 216 such as that which is described above, may be activated 316 to generate a proximity signal that may be received by the controller 230. In one embodiment, if the proximity sensor 116 (see FIG. 1) positioned on the earmount 106 does not detect proximity or touch 358, then the device 102 may, for example, remain in standby mode 356 if already in standby mode, or if previously in active mode, power down the device 102 to a standby state 356 of power consumption. If the proximity sensor 116 detects proximity or touch 358 with the proximity sensor 116 positioned on the earmount 106 of the electronic device 102, the method can include powering up 360 the device 102 to an active state of power consumption when the proximity sensor detects proximity 358, or maintaining its active state if the device 102 is already in an active state. It is understood that instruction modules stored in the memory 234 and/or circuitry and in communication with the controller 230 may provide instructions for carrying out the methods described herein.

In another embodiment, where the device 102 (see FIG. 1) includes a speaker 122 configured to generate an audible alert and the earmount 106 includes a vibrator 120 configured to generate a vibratory alert, a method may further include changing a state of the device 102 between providing an audible alert via the speaker 122 and providing a vibratory alert via the vibrator 122, based on whether the proximity sensor detects proximity 358. Accordingly, when the device 102 detects proximity or touch 358, the method can include deactivating the speaker alert 342 and activating the vibratory alert 344. It is understood that when the device 102 does not detect proximity 358, that the method can include deactivation of the vibratory alert and activation of the speaker alert. Moreover, the device 102 may include, for example, a range of speaker or audio loudness settings that may be adjustable based upon whether the device detects proximity 358.

In another embodiment, the device 102 (see FIG. 1) may further include at least one indicator light 146 configured to generate a visible alert to provide an indication of a state of the device. A method may further include changing 346 between providing a visible light indication via the at least one indicator light 146 and discontinuing a visible light indication based on whether the proximity sensor detects proximity 358.

In yet another embodiment, the device 102 may further include a transceiver 232 (see FIG. 2) disposed within the housing 104 (see FIG. 1). The method may also include changing a radio frequency (RF) output power 348 of the transceiver 232, based on whether the proximity sensor detects proximity 358. In still another embodiment, the device 102 may further include an alterable antenna conformation 250 (see FIG. 2). The method may also include altering the antenna conformation 350, based on whether the proximity sensor detects proximity 358.

FIG. 4 is a flowchart illustrating another embodiment of a method of the device 202 (see FIG. 2). In this example, output and input is characterized as binary information. It is understood that any embodiment may be characterized as binary or analog operations. In the embodiment of FIG. 4, the earmount 106 (see FIG. 1) includes two proximity sensors, sensor #1 and sensor #2. Each of the two proximity sensors may be activated to generate a proximity signal, and monitored 462 for the presence of such a signal. In the embodiment of FIG. 4, sensor #1 may be configured to detect proximity of an auricle of a user's ear, and configured to output a "1" when an auricle is detected with a predetermined distance, for example, 10 mm. Sensor #2 may be configured to detect proximity of a side of a user's head, and configured to output a "1" when a head is detected with a predetermined distance, for example, 10 mm.

A query may be made 464 whether the monitored output of sensor #1 is detected to be 1, and the monitored output of sensor #2 is detected to be 1. If the query has a positive result "YES," then the device may be placed in an earmount mode 466 in which an alert may be provided to a user via the vibrator, rather than via a speaker which can provide an audible alert. In addition, earmount mode may provide for minimal use of indicator lights. Moreover, the output power of the transceiver of the device may be reduced in earmount mode. An antenna conformation may be altered so that RF emissions may be directed away from a user's head.

If the query has a negative result "NO," then the device may be placed in a free space mode 468. In free space mode an alert may be provided to the user via the speaker. Usage of indicator lights accordingly may be increased or maximized. The output power of the transceiver may be increased as well. In addition, the antenna may be configured for an omnidirectional mode.

It will be appreciated that utilization of sensor signals of the disclosed proximity sensor may provide an improvement in talk time. Talk time may be calculated from the total capacity of a main battery within the wireless communication device and the average current consumption from the battery during the transmit period of the device. Hence, all efforts to reduce the current consumption during the transmit period would result in improved talk time.

As described above, changes in how the device operates may be made, depending on whether the proximity sensor detects the presence of a user's head. These changes may reduce current consumption, especially when the most users may be expected to use the devices placed on their ear lobes.

As discussed above other changes to the operation of the device may conserve energy when proximity is detected by one or more proximity sensors. Reduction of transmit power may reduce transceiver power consumption when the efficiency of a power amplifier is kept at the same level. The reduction of power is possible without degrading the wireless communication device performance level because (1) an ear mounted device is not subject to the hand interference, (2) switching the antenna radiation pattern to a directional pattern, away from a head, would result in the higher antenna gain which could further allow transceiver power to be reduced without degrading the performance. Also, turning off the unnecessary indicator lights may further reduce total current consumption. Since the ear mount condition would not allow a user to see the indicator lights, all unnecessary lights may be turned off.

As discussed above, in smaller devices having smaller power sources 236 (see FIG. 2) such as a battery, there may be a premium on power conservation. A proximity sensor 116 (see FIG. 1) placed on an earmount 106 to detect proximity may help provide power conservation with respect to the active and standby states of the device 102 as well as illumination of indicator lights 146. It is understood that other power saving circuitry and/or methods are within the scope of this discussion. The placement of the proximity sensor 116 and the vibrator 120 in a position on the earmount 106 may also help provide a safety mechanism for avoiding a ring tone generated near a user's ear. Moreover, the placement of the proximity sensor 116 on the earmount 106, may also help provide input for control of the radio frequency (RF) output power of the transceiver 232 and a circuit and/or instructions for antenna conformation 250, and may thereby help reduce the specific absorption rate (SAR) of the device.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A wireless communication device capable of being positioned in a wearable position adjacent a user's head, the device configured to have a plurality of states, the device comprising:
 a housing;
 a controller supported by the housing;
 an arcuate earmount coupled to the housing, the arcuate earmount including an overhanging portion and a hinge portion, the hinge portion coupling the earmount to the housing; and
 a proximity sensor coupled to the controller, the proximity sensor positioned on the overhanging portion of the earmount, the proximity sensor configured to detect proximity,
 wherein the device is configured to change a state based on whether the proximity sensor detects proximity.

2. The device of claim 1, wherein the plurality of states includes an active mode and a standby mode.

3. The device of claim 1, wherein the earmount comprises a vibrator configured to generate a vibratory alert, the device further comprising:
 a speaker disposed within the housing and configured to generate an audible alert,
 wherein:
  the device is configured to generate an alert; and
  the device includes a circuit in communication with the controller configured to switch between generation of the audible alert via the speaker and generation of the vibratory alert via the vibrator, based on whether the proximity sensor detects proximity.

4. The device of claim 1, wherein the earmount comprises a vibrator configured to generate a vibratory alert, and wherein the vibrator includes at least one of a piezoelectric vibrator or a speaker.

5. The device of claim 1, further comprising:
 at least one indicator light configured to generate a visible indication of a state of the device and coupled to a circuit in communication with the controller, the circuit configured to switch between activation of the at least one indicator light and deactivation of the at least one indicator light based on whether the proximity sensor detects proximity.

6. The device of claim 1, further comprising:
 a transceiver coupled to the controller and disposed within the housing, the transceiver coupled to a circuit configured to change a radio frequency (RF) output power of the transceiver, based on whether the proximity sensor detects proximity; and an alterable antenna conformation coupled to the transceiver and coupled to a circuit configured to alter the antenna conformation, based on whether the proximity sensor detects proximity.

7. The device of claim 1, wherein the earmount comprises an earhook.

8. The device of claim 1, wherein the sensor is a capacitive sensor.

9. A wireless communication device capable of being positioned in a wearable position adjacent a user's head, the device configured to have a plurality of states, the device comprising:
   a housing;
   a earmount coupled to the housing, the earmount including a hinge portion, the hinge portion including a hinge rotatably coupling the earmount to the housing, and the hinge configured to change the orientation of the earmount from a first orientation with respect the housing to a second orientation with respect to the housing; and
   at least one proximity sensor positioned on the earmount, the proximity sensor configured to detect proximity when the earmount is in either the first orientation or the second orientation,
   wherein the device is configured to change a state based on whether the proximity sensor detects proximity.

10. The device of claim 9, wherein the plurality of states includes an active mode and a standby mode.

11. The device of claim 10, wherein the proximity sensor is a touch sensor.

12. The device of claim 9, wherein the earmount comprises a vibrator configured to generate a vibratory alert, the device further comprising:
   a speaker disposed within the housing and configured to generate an audible alert,
   wherein:
      the device is configured to generate an alert; and
      the device is configured to switch between generation of the audible alert via the speaker and generation of the vibratory alert via the vibrator, based on whether the proximity sensor detects proximity.

13. The device of claim 9, wherein the earmount comprises a vibrator configured to generate a vibratory alert, and wherein the vibrator includes at least one of a piezoelectric vibrator and a speaker.

14. The device of claim 9, further comprising:
   at least one indicator light configured to generate a visible indication of a state of the device and coupled to a circuit configured to switch between activation of the at least one indicator light and deactivation of the at least one indicator light based on whether the proximity sensor detects proximity.

15. The device of claim 9, further comprising:
   a transceiver coupled to the controller and disposed within the housing, the transceiver coupled to a circuit configured to change a radio frequency (RF) output power of the transceiver, based on whether the proximity sensor detects proximity; and
   an alterable antenna conformation coupled to the transceiver and coupled to a circuit configured to alter the antenna conformation, based on whether the proximity sensor detects proximity.

16. The device of claim 9, wherein the sensor is a capacitive sensor.

17. A method of a wireless communication device including an earmount, the device capable of being positioned in a wearable position adjacent a user's head, the device further including a transceiver disposed within the housing, the method comprising:
   detecting proximity with a proximity sensor positioned on the earmount; and
   changing a radio frequency (RF) output power of the transceiver, based on whether the proximity sensor detects proximity.

18. The method of claim 17, wherein the device further includes an alterable antenna conformation, the method further comprising:
   altering the antenna conformation, based on whether the proximity sensor detects proximity.

* * * * *